(12) United States Patent
Marx

(10) Patent No.: US 9,327,923 B1
(45) Date of Patent: May 3, 2016

(54) PORTABLE HEATED RAMP AND METHOD

(71) Applicant: Quintin S. Marx, Lake Forest, IL (US)

(72) Inventor: Quintin S. Marx, Lake Forest, IL (US)

( * ) Notice: Subject to any disclaimer, the term of this patent is extended or adjusted under 35 U.S.C. 154(b) by 0 days.

(21) Appl. No.: 14/543,581

(22) Filed: Nov. 17, 2014

(51) Int. Cl.
| | |
|---|---|
| *E01D 15/12* | (2006.01) |
| *B65G 69/28* | (2006.01) |
| *B65G 69/30* | (2006.01) |
| *B32B 37/24* | (2006.01) |
| *B32B 37/12* | (2006.01) |

(52) U.S. Cl.
CPC .......... *B65G 69/287* (2013.01); *B32B 37/1284* (2013.01); *B32B 37/24* (2013.01); *B65G 69/30* (2013.01); *B32B 2037/243* (2013.01); *B32B 2307/202* (2013.01); *B32B 2605/00* (2013.01)

(58) Field of Classification Search
CPC ................................ B65G 69/28; B65G 69/30
USPC ........................ 219/201, 213, 522, 544, 548
See application file for complete search history.

(56) References Cited

U.S. PATENT DOCUMENTS

| | | | |
|---|---|---|---|
| 756,507 A | 4/1904 | Knopf | |
| 1,062,199 A | 5/1913 | Stephenson | |
| 1,203,179 A | 10/1916 | Bowels | |
| 1,262,930 A | 4/1918 | Diaz | |
| 1,597,638 A | 8/1926 | Vincent | |
| 1,704,841 A | 3/1929 | Sacerdote | |
| 2,500,486 A | 3/1950 | Copenhaver | |
| 2,501,819 A | 3/1950 | Kloepper | |
| 2,522,841 A | 9/1950 | Ross | |
| 2,745,942 A * | 5/1956 | Cohen ...................... | H05B 3/00 219/528 |
| 2,802,286 A | 8/1957 | Wylie | |
| 2,816,201 A | 12/1957 | Mulvey | |
| 2,844,696 A | 7/1958 | Custer | |
| 2,890,747 A | 6/1959 | Murphy | |
| 2,912,555 A | 11/1959 | Jamison | |
| 2,997,568 A | 8/1961 | Evancich et al. | |
| 3,031,739 A | 5/1962 | Boggs | |
| 3,047,701 A * | 7/1962 | Frungel ................. | E01C 11/265 219/213 |
| 3,069,522 A | 12/1962 | Jamison | |
| 3,179,544 A | 4/1965 | Smith-Johannsen | |
| 3,181,440 A | 5/1965 | Carlton et al. | |
| 3,328,818 A | 7/1967 | Melcher | |
| 3,331,433 A | 7/1967 | Hagberg | |
| 3,336,557 A * | 8/1967 | Lund ....................... | F24D 13/02 219/212 |
| 3,405,534 A | 10/1968 | Sullivan | |
| 3,418,448 A | 12/1968 | Pradenas | |
| 3,423,559 A | 1/1969 | Kuhns | |
| 3,502,539 A * | 3/1970 | MacPhail, Sr. ......... | E04C 2/243 156/71 |
| 3,859,504 A | 1/1975 | Fukushima et al. | |
| 4,094,686 A | 6/1978 | Dubois | |
| 4,246,982 A | 1/1981 | Pretnick | |
| 4,247,756 A * | 1/1981 | Cucinotta ................ | H05B 3/38 219/217 |
| 4,712,264 A * | 12/1987 | Voith ...................... | A61G 3/061 14/69.5 |
| 4,814,580 A | 3/1989 | Carageorge | |

(Continued)

*Primary Examiner* — Thomas B Will
*Assistant Examiner* — Katherine Chu
(74) *Attorney, Agent, or Firm* — Erickson Law Group, PC

(57) ABSTRACT

A heated portable cargo ramp and method of making the same is provided. The ramp has an elongated base comprising a length that is longer than a width of the base. A first ceramic insulating layer is provided above the elongated base. A heating element is provided above the first ceramic insulating layer. The heating element comprises an elongated flexible mat. A first rubber layer is provided above the heating element. A second ceramic insulating layer is provided above at least the portion of the rubber layer which extends over the heating element. A second rubber layer is provided above at least the portion of the second ceramic insulating layer which extends over the laminated paper-enclosed heating element.

20 Claims, 11 Drawing Sheets

(56) References Cited

U.S. PATENT DOCUMENTS

| | | | |
|---|---|---|---|
| 4,967,057 A | 10/1990 | Bayless et al. | |
| 5,233,971 A | 8/1993 | Hanley | |
| 5,550,350 A | 8/1996 | Barnes | |
| 5,605,642 A | 2/1997 | Nece | |
| 5,614,292 A | 3/1997 | Saylor | |
| 5,942,140 A | 8/1999 | Miller et al. | |
| 5,998,770 A | 12/1999 | Sunby | |
| 6,140,609 A | 10/2000 | Jones | |
| 6,184,496 B1 * | 2/2001 | Pearce | E01C 11/265 219/202 |
| 6,855,915 B2 * | 2/2005 | Gehring | H05B 3/36 219/213 |
| 7,044,487 B2 | 5/2006 | Byrne | |
| 7,854,032 B2 | 12/2010 | Igwemezie et al. | |
| 8,076,619 B1 * | 12/2011 | Wingale | A47G 27/0287 182/178.1 |
| 8,306,408 B2 * | 11/2012 | Abbott | B32B 7/02 219/213 |
| 8,413,280 B2 | 4/2013 | Goin et al. | |
| 8,540,455 B1 | 9/2013 | Maddux | |
| 8,772,679 B2 | 7/2014 | Novikov | |
| 8,864,925 B2 * | 10/2014 | Kimura | H01G 4/005 156/182 |
| 9,204,495 B2 * | 12/2015 | Soerensen | H05B 3/146 |
| 2001/0000841 A1 | 5/2001 | Birch et al. | |
| 2004/0099654 A1 | 5/2004 | Pais | |
| 2004/0188418 A1 * | 9/2004 | Aisenbrey | B29C 45/0013 219/528 |
| 2004/0201197 A1 | 10/2004 | Takeshima et al. | |
| 2005/0199282 A1 | 9/2005 | Oleinick et al. | |
| 2007/0075519 A1 | 4/2007 | Stoops | |
| 2008/0116652 A1 | 5/2008 | Storer | |
| 2009/0033058 A1 | 2/2009 | VanderGriend et al. | |
| 2010/0089899 A1 * | 4/2010 | Dohring | F24D 13/024 219/213 |
| 2010/0175824 A1 * | 7/2010 | Hopkins | H05B 3/34 156/249 |
| 2012/0216725 A1 * | 8/2012 | Pegot-Ogier | B65F 1/0033 108/50.13 |
| 2013/0034343 A1 | 2/2013 | Gilad | |

* cited by examiner

PORTABLE HEATED RAMP AND METHOD

FIELD OF THE INVENTION

The invention relates portable heated ramps.

BACKGROUND OF THE INVENTION

Portable ramps are used in a variety of applications, such as to allow a person, cargo, vehicle and/or other items to move between an upper and a lower surface or to span a gap between surfaces on the same level.

One application where ramps are used is to provide access to the back of a truck or trailer. The bed of a cargo area of a truck or trailer is usually located above the ground. If the truck or trailer is not backed up to a loading dock having the appropriate height then loading and unloading is made more difficult due to the height difference between the ground and the bed of the truck or trailer. Cargo areas of trucks and trailers are loaded and unloaded daily across the country, in various environments, and in various weather conditions. When ramps are used to provide access to the cargo areas of trucks and trailers that are unloaded outside or areas that are not temperature controlled, those ramps will be subject to the environmental conditions. When those conditions provide temperatures that are near, at, or below the freezing point of water, there is a risk that moisture that might accumulate on the ramp will freeze or partially freeze. Such freezing can create a slippery, and unsafe, condition on the ramp. Slippery conditions can also be created on the ramp by falling snow accumulating on the ramp surface.

Even when ramps are provided with a course upper surface to provide improved grip, moisture can freeze or snow can accumulate on the ramp surface and create a slippery condition, such as when the freezing water or snow accumulates over the grip surface. It is well known that frozen moisture or snow can sometimes be difficult to see. In addition, if workers are carrying freight that obstructs their view of the ground when loading or unloading, even frozen moisture or snow that would be otherwise visible might not be seen may a worker carrying such freight. As a ramp is often used between two surfaces of different heights, the angled nature of the ramp will increase slip and fall risks over such risks on a level surface.

The present inventor recognized that despite all appropriate care, many workers each year are injured by slipping on snow or frozen moisture present on a ramp. The present inventor recognized it would be desirable to provide a portable surface that reduced the slip and fall risks in snowy or freezing conditions. The present inventor recognized it would be desirable to provide a heat source under the portable surface to prevent moisture from freezing and snow from accumulating on the surface.

The present inventor recognized that it would be desirable to provide a method of manufacturing a portable heated ramp. The present inventor recognized that it would be desirable to provide a method of retro-fitting existing portable ramps with a heating capability.

SUMMARY OF THE INVENTION

A heated portable cargo ramp and method of making the same is disclosed. The ramp has an elongated base comprising a length that is longer than a width of the base. A first ceramic insulating layer is provided above the elongated base. A heating element is provided above the first ceramic insulating layer. The heating element comprises an elongated flexible mat. A first rubber layer is provided above the heating element. A second ceramic insulating layer is provided above at least the portion of the rubber layer which extends over the heating element. A second rubber layer is provided above at least the portion of the second ceramic insulating layer which extends over the laminated paper-enclosed heating element.

Numerous other advantages and features of the present invention will become readily apparent from the following detailed description of the invention and the embodiments thereof, from the claims and from the accompanying drawings.

DETAILED DESCRIPTION

Figure 1:
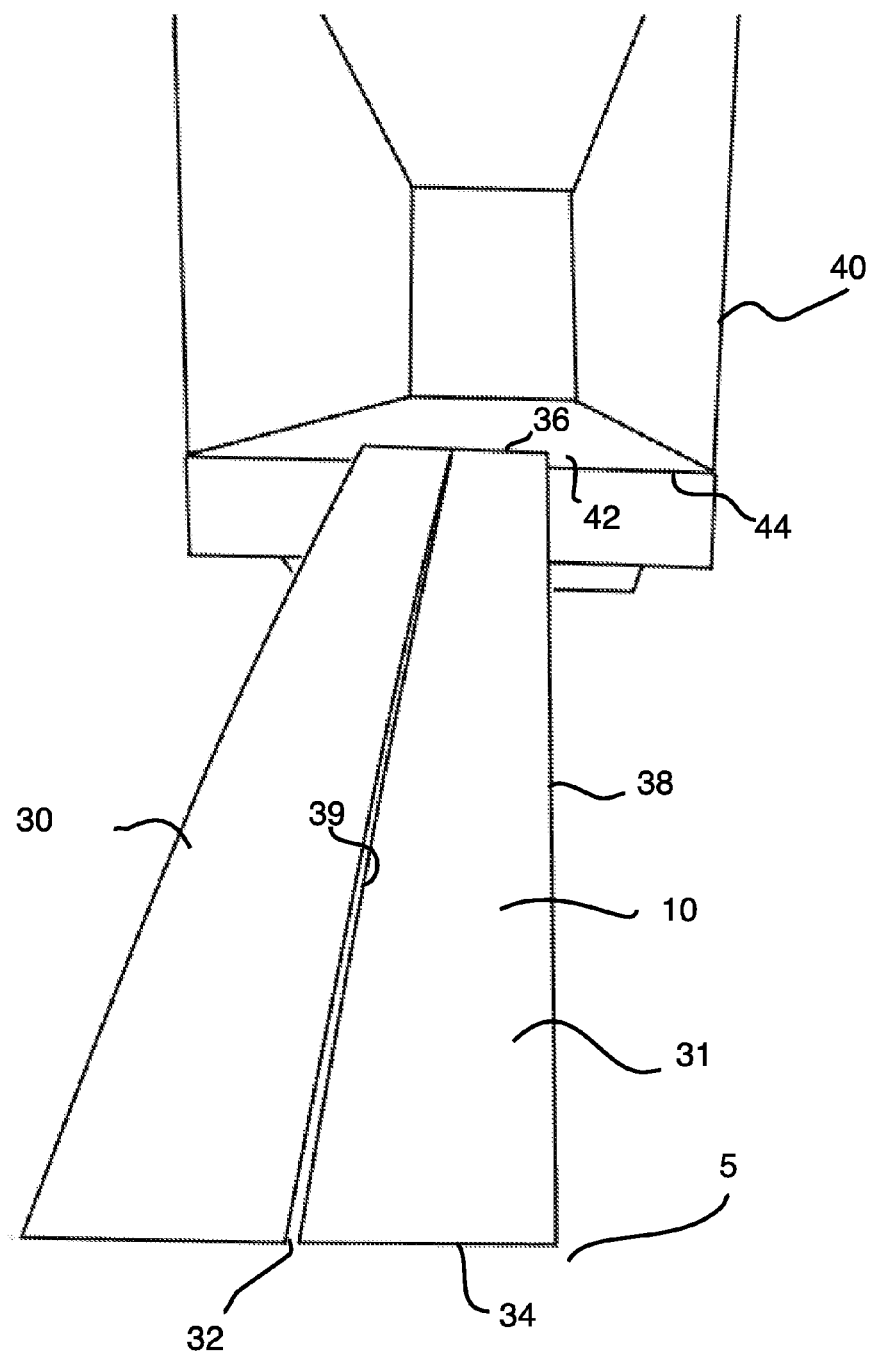
FIG. 1 is an end view of a two heated portable ramp of the present invention deployed in one type of application.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 shows a first portable ramp 10 and a second portable ramp 30 extending from a rear open end of a cargo trailer 40. The first portable ramp 10 and the second portable ramp 30 are mirror image identical about the middle gap 32, so only the first portable ramp 10 will be described in detail. The first and second portable ramps 10, 30 may be connected to each other at the middle gap by a hinge (not shown) or a connecting bar (not shown). In some arrangements, the middle gap does not exists and the interior side edges of each portable ramp abut. In some arrangements, the middle gap is wider than shown in FIG. 1. In some arrangements, only one portable ramp is used. In some arrangements, the first portable ramp 10 and the second portable ramp 30 are spaced apart to a width of the width of the wheels of a vehicle to allow a vehicle to be drive thereon.

The ramp 10 has a longitudinal first end 34 and an opposite longitudinal second end 36. The ramp 10 has a side first edge 38 and an opposite side second edge 39. FIG. 1 shows the first end 34 is contact with an exterior surface 5, such as a ground. The ground can be any exterior support surface, such as a road, a driveway, a parking area, a shop floor, a dock, an unpaved surface, etc. The second end 36 is supported on the floor surface 42 of the trailer 40 at or adjacent the rear edge 44 of the floor surface 42.

Figure 2:
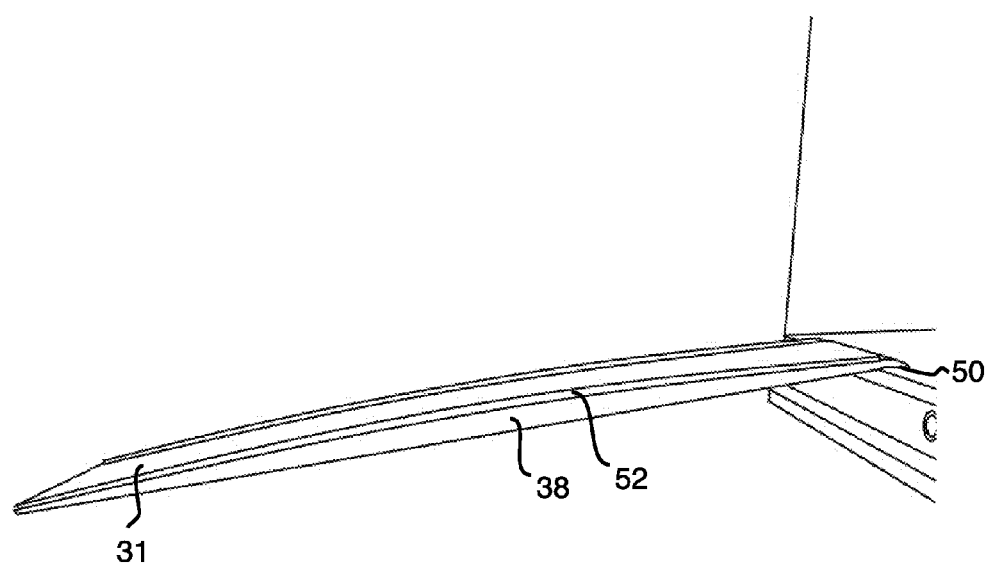
FIG. 2 is a side view of the heated portable ramps of FIG. 1.
Figure 3:
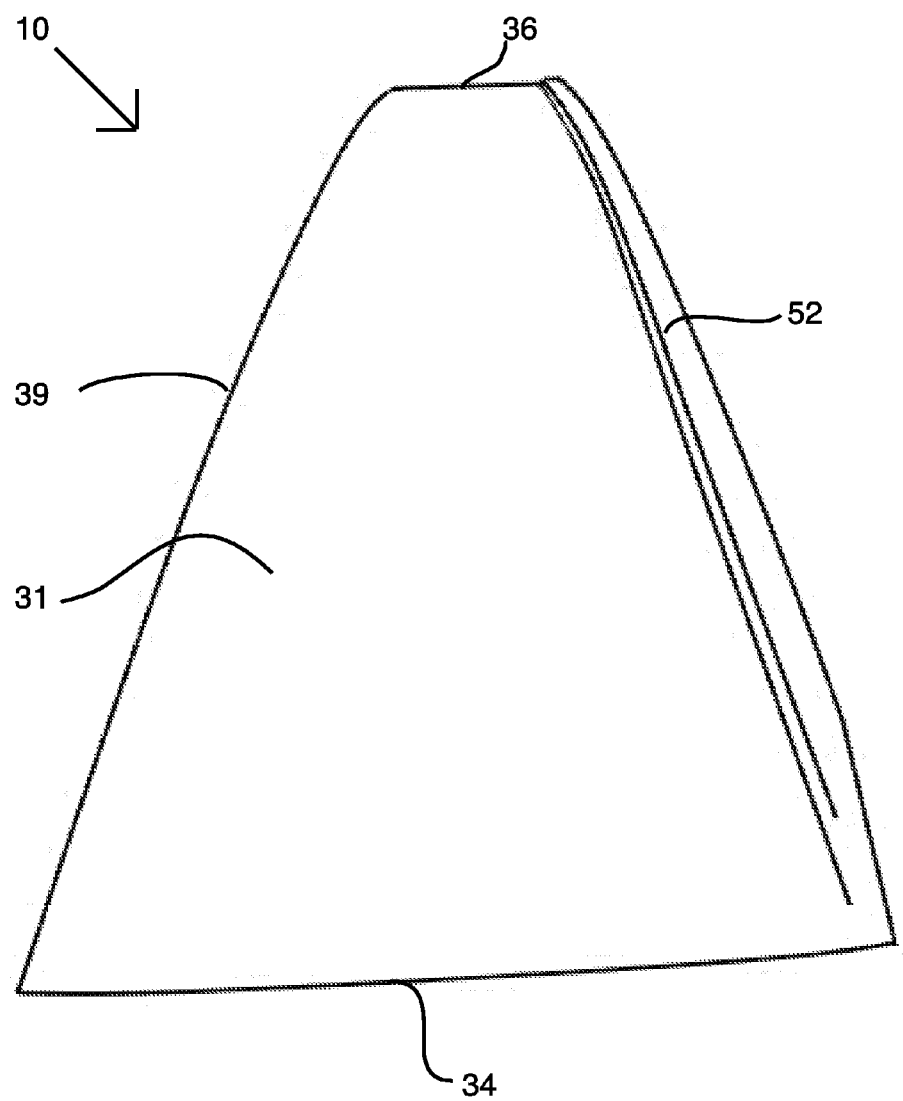
FIG. 3 is a perspective end view of the one of the heated portable ramps of FIG. 1.

FIG. 2 shows a side view taken from FIG. 1, with the gap 32 not shown. The side first edge 38 comprises a rail 52 that extends above the main surface 31 of the ramp 10. The bottom side of the ramp 10 at the second end 36 comprises a flat contact surface 50 angled and arranged to contact a support surface such as the floor surface 42. The surface 50 may be corrugated or provided with a friction material. As shown in FIG. 3, the rail 52 has a width.

Figure 4:
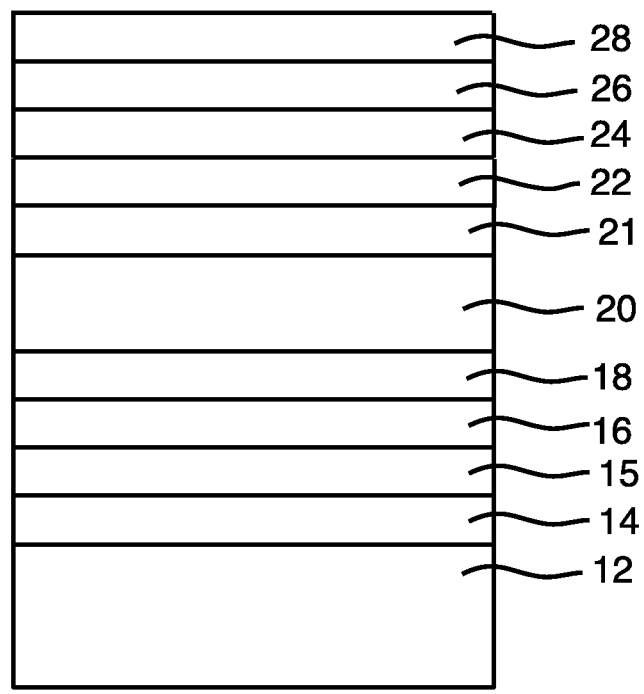
FIG. 4 is a diagrammatic cross-section view of the ramp of FIG. 3.

FIG. 4 shows a section view of the ramp 10. The layers shown in FIG. 4 are not shown with thicknesses to scale. The ramp 10 has a base 12. The base may comprise wood, metal, plastics, fiberglass, or other support materials. The base 12 provides, at least in part, structural support to the ramp 10. Above the base 12 is a first ceramic layer 14. The first ceramic layer is an insulating layer. In some embodiments, the first ceramic layer is formed by applying one or more layers/coats of ceramic infused epoxy paint. In some embodiments, the one or more layers is from one to three layers/coats of ceramic infused epoxy paint. In some embodiments, the first ceramic layer comprises a Behr Premium 1-Part Epoxy Concrete and Garage Floor Paint from the BEHR Process Corporation, 3400 W. Segerstrom Ave. Santa Ana, Calif. 92704, combined with a Ceramic Paint Additive from Hy-Tech Thermal Solutions, LLC, 159 Parkhill Blvd., W. Melbourne, Fl 32904. The substance, such as ceramic infused epoxy paint, is a flowable substance applied wet and allowed to dry.

Above the ceramic layer is a first paper layer 16. An adhesive layer 15, such as a contact cement layer, may be applied between the ceramic layer 14 and the first paper layer 16 to join the two layers. Above the first paper layer 16 is a heating element 20. A second adhesive layer 18, such as a contact cement layer, may be applied between the first paper layer 16 and the heating element 20 to join them. In some embodiments, the heating element is flexible.

Figure 11:
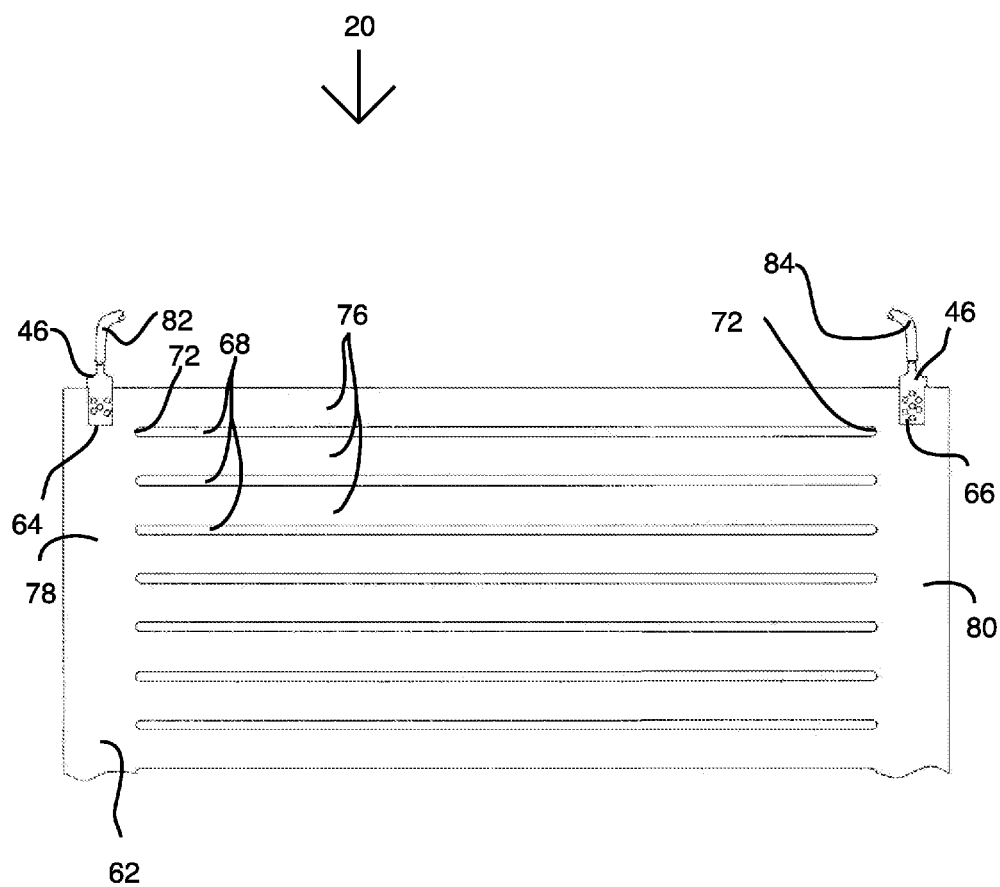
FIG. 11 is a top view of an embodiment of a heating element of the ramp of FIG. 3.

In some embodiments, the heating element 20 comprises an elongated web 62 of a flexible, electrically conductive plastic, such as a mixture of polyethylene mixed with carbon black as shown in FIG. 11. The heating element may comprise positive temperature coefficient (PTC) material. There are two longitudinally electrodes 64 and 66 embedded in the web, one adjacent each side edge. These electrodes may be, for example, a braided wire. The web has a plurality of transversely extending slots 68 therein. The slots 68 extend substantially across the width of the web and preferably have a constant width, except at their rounded ends 72 and 74. The slots 88 define a plurality of transversely extending rungs 76 which extend between longitudinally extending rails 78 and 80 in which the electrodes 64 and 66 are embedded. An example of such a heating element is the STEP WARMFLOOR™ heating element, available from Electro Plastics, Inc., 11147 Dorsett Rd., Maryland Heights, Mo., 63043-3505. In some embodiments, the element 20 can be 24 to 34 cm wide, and 1.2 mm thick, and come in various lengths, such as 7 to 30 meters. The heating element can be capable of being cut to any desired length. These heating elements are made from an electrically conductive butyl soluted low density polyethylene and carbon black. Lead wires 82 and 84 are physically secured to the heating element 20, and are electrically connected to the electrodes 64 and 66, respectively, with crimped contacts 46.

Figure 5:
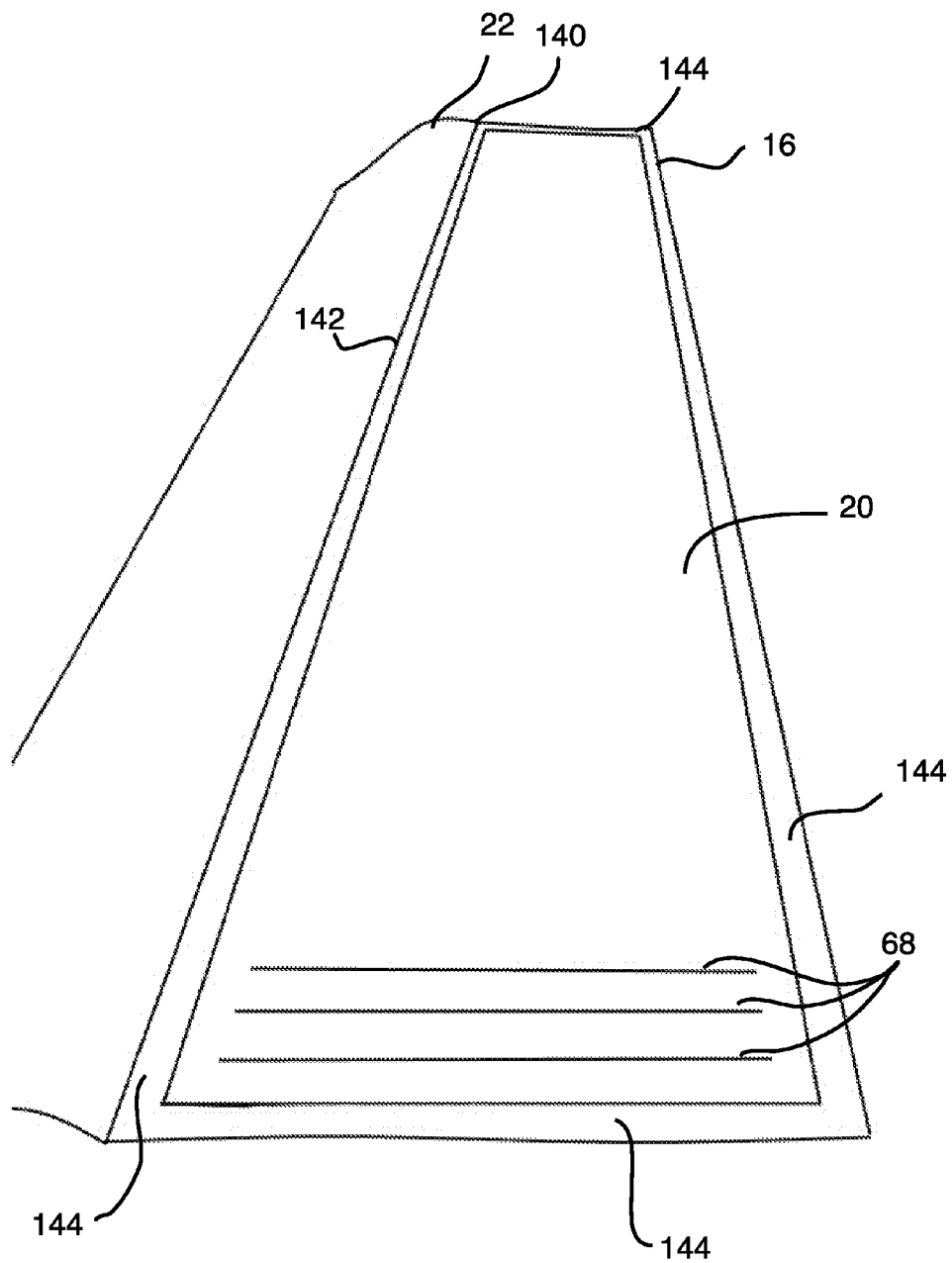
FIG. 5 is a perspective end view of a heating element and a paper layer of the heated portable ramp of FIG. 3.
Figure 6:
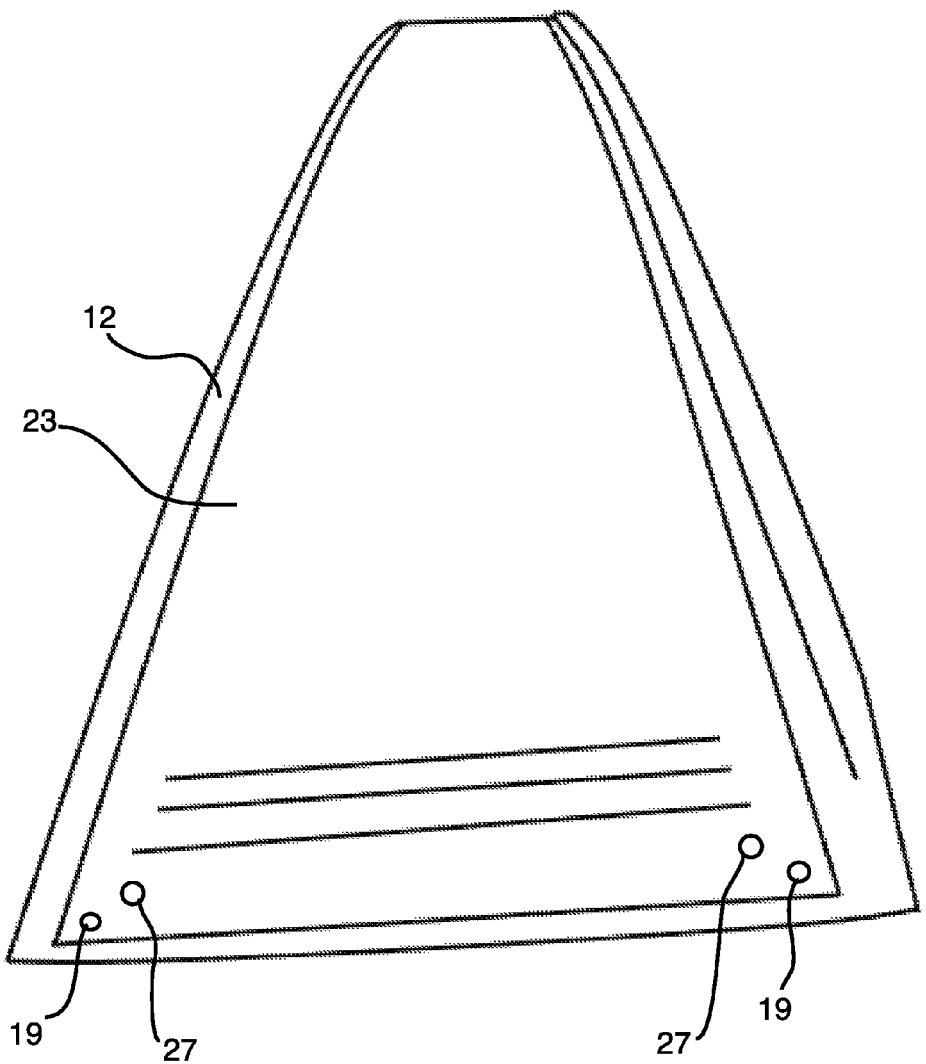
FIG. 6 is a perspective end view of the heated portable ramp of FIG. 3 in one stage of manufacture.
Figure 7:
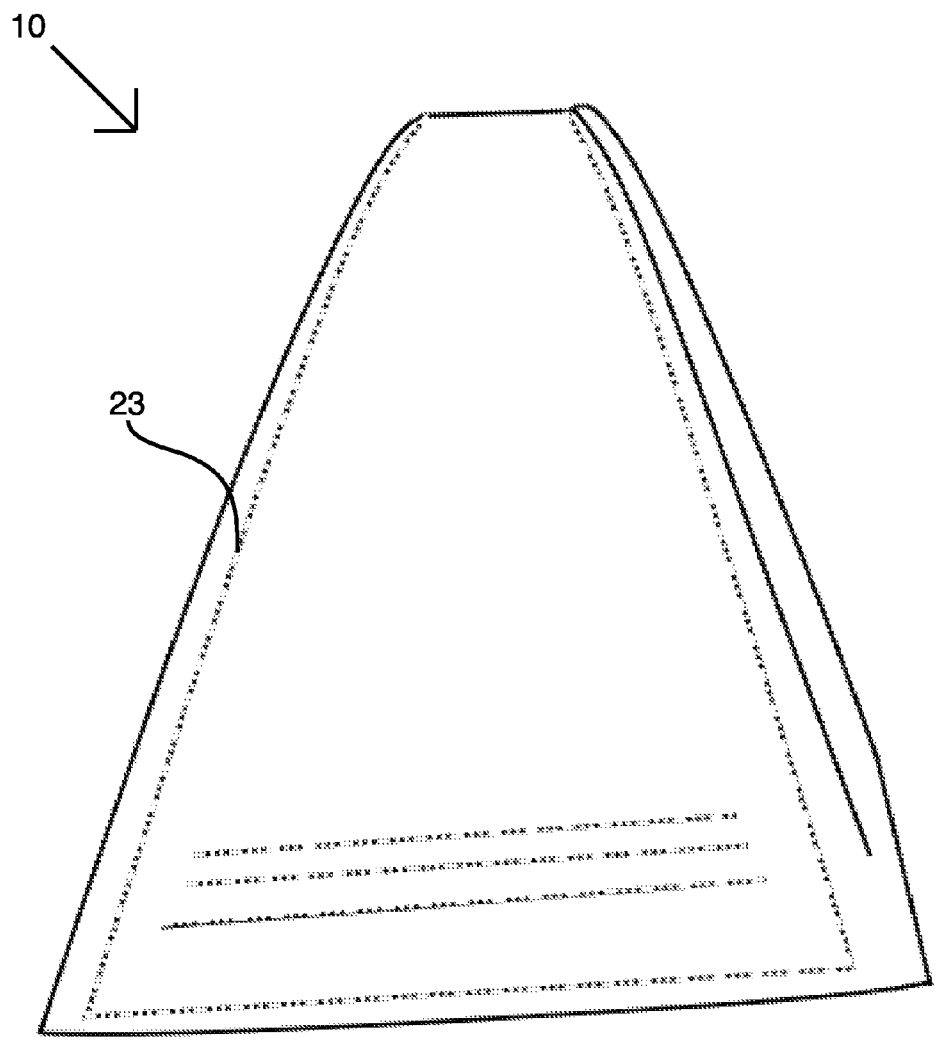
FIG. 7 is a perspective end view of the heated portable ramp of FIG. 3 in another stage of manufacture.

The electrodes 62, 66 allow a potential to be applied transversely across the web, thereby generating heat. There are a plurality of slots 68 extending transversely across the web to increase the flexibility of the web and decrease the cross sectional area of the web. These heating elements operate at wattages in the range of 50 to 80 watts, inclusive, and at relative low voltages (24, 36, or 48 volts). The heating elements are to some extent self-regulating because as the temperature of the element increases, the resistance increases, decreasing the current and thus the heat being generated. Not all slots 68 are shown in FIGS. 5-7. Only some of the slots closest to the end 34 are shown. The other slots are not show but may extent along the entire longitudinal length of the heating element in the manner provided by the slots shown.

In some embodiments, an electrically insulating coating is applied over the top and bottom surfaces of the heating element. This electrically insulating coating can be an electrically insulating adhesive. In some embodiments, the adhesive is pressure sensitive and latex-based. The pressure sensitive adhesive may be a polyvinyl alcohol stabilized vinyl acrylic copolymer emulsion that can be applied with a foam roller to the element. The adhesive coats all the external surfaces of the element, including the side edges and the edge of the slots. When the adhesive dries an electrically insulating adhesive layer approximately 0.046 mm thick remains on the external surfaces of the heating element. Each adhesive layer on the heating element can covered with protective sheets (not shown), which can be, for example, polyethylene sheets having a silicone release agent on the contact surfaces.

In some embodiments, the heating element is the heating element described in U.S. Pat. No. 5,961,869, which is herein incorporated by reference in its entirety. However, other flexible heating elements can be used.

Above the heating element 20 is a second paper layer 22. A third adhesive layer 21, such as contact cement, may be applied between the heating element 20 and the second paper layer 22 to join them.

Above the second paper layer 22 is a first rubber layer 24. The first rubber layer 24 may comprise polyurethane infused with rubber granules. In some embodiments, the first rubber layer comprises Herculiner Truck Bed Liner, from Old World Industries, LLC 4065 Commercial Ave, Northbrook, Ill. 60062-1851. The first rubber layer is a protective layer. The first rubber layer may be applied as a flowable liquid rubber or flowable polyurethane infused with rubber granules. The first rubber layer can dry to a hard consistency.

Above the first rubber layer 24 is a second ceramic layer 26. The second ceramic layer is an insulating layer. The second ceramic layer may comprise the same material as the first ceramic layer. In some embodiments, the second ceramic layer is formed by applying one or more layers/coats of ceramic infused epoxy paint, but at least one fewer layer than is used for the first ceramic layer. Therefore the second ceramic layer will be thinner than the first ceramic layer. This allows heat from the heating element to radiate upward because there is less ceramic insulation above the heating element than below. The insulating effect of the second ceramic layer is such that heat from the heating element is able to build up, but not so much as to prevent heat from radiating upward to the exposed upper surface of the ramp to melt snow and frozen moisture. In some embodiments, the one or more layers from one to two layers/coats of ceramic infused epoxy paint.

Above the second ceramic layer 26 is a second rubber layer 28. In some embodiments, the second rubber layer 28 comprises polyurethane infused with rubber granules. The second rubber layer may comprises the same substance as the first rubber layer and may be applied in the same manner. In some embodiments, the second rubber layer may comprise two layers/coats of polyurethane infused with rubber granules.

Figure 8:
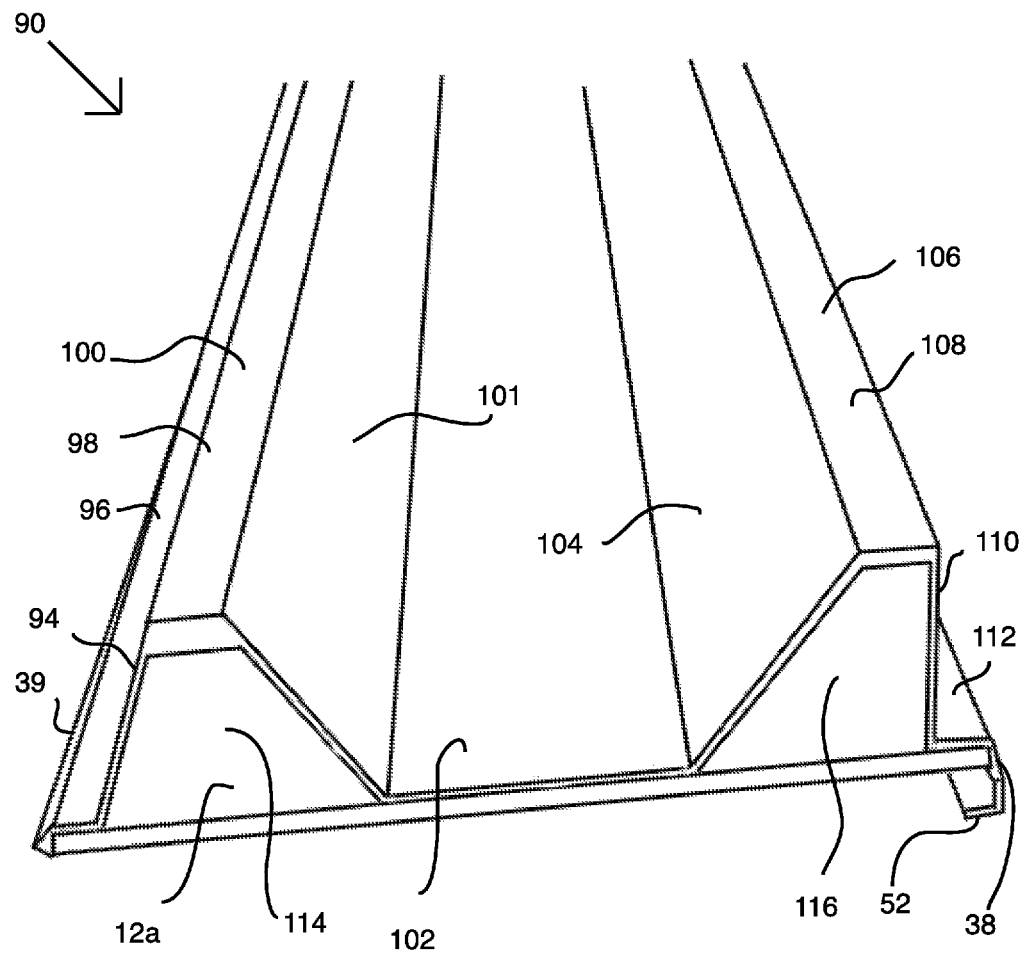
FIG. 8 is a bottom perspective end view of the ramp of FIG. 3.

In some embodiments, the ramp 10 comprises a support structure 90, as shown in FIG. 8. The ramp 10 is shown in perspective cross-section and up-side-down in FIG. 8. The bottom 12a of the base 12 is in contact with the top of the support structure 90 along portions of the support structure. The support structure comprises an inside channel 100 and an outside channel 106. The inside channel 100 comprises an inside wall 94, a top wall 98, and an outside wall 101. The inside angled wall 94 and the outside wall 101 are angled and extend toward each other and are joined by the top wall 98. The outside channel 106 comprises an inside wall 104, a top wall 108, and an outside wall 110. The inside wall 104 is angled and extends toward the outside wall 110. The outside wall is perpendicular to the top wall 108. An in-between wall 102 connects the inside channel 100 with the outside channel 106. Adjacent each of the channels 100, 106 respectively, opposite the in-between wall 102, is an inside bottom wall 96 and an outside bottom wall 112. The inside bottom wall 96 joins the side second edge 39. The outside bottom wall 112 joins with the rail 52. The inside bottom wall 96, the outside bottom wall 112, and the in-between wall 102 are coplanar or substantially coplanar with each other. The top wall 98 and the top wall 108 are coplanar or substantially coplanar with each other. The interior 114, 116 of the respective channels 100, 106 can be hollow or filled. The bottom 12a of the base is supported by and/or in contact with the inside bottom wall 96, the outside bottom wall 112, and the in-between wall 102. The base 12 is secured laterally between the side first and second edges 38, 39.

In some embodiments, the base 12 and the support structure 90 comprise a ramp having a model number of 1636L, having a 16 foot length, a 36 inch width, and a 5,000 pound load capacity made by Melcher Manufacturing, Inc., 6017 E. Mission Ave, Spokane Valley, Wash. 99212. Any other portable ramp or walkboard can comprise the base 12 and support structure 90 combination. The ramp may be flat or may have an arch in the longitudinal direction and/or the transverse direction.

Figure 9:
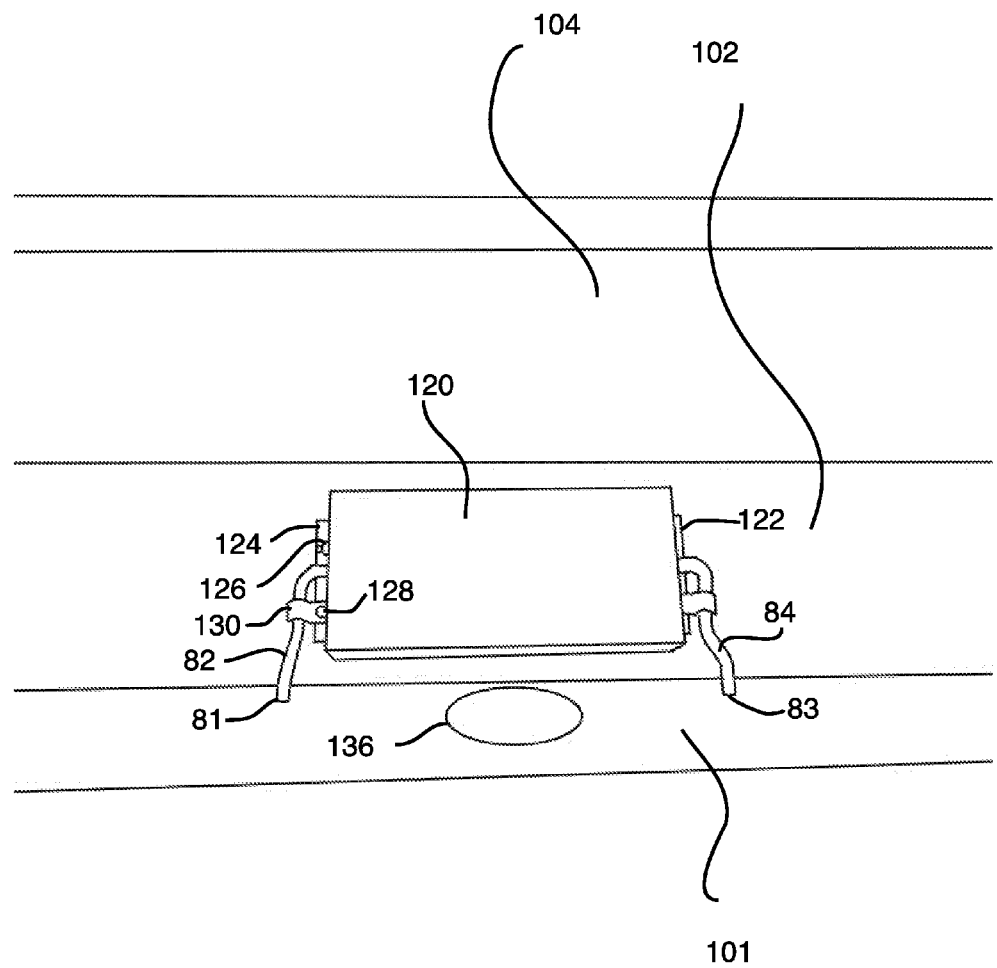
FIG. 9 is a partial bottom perspective view of the ramp of FIG. 3 with a power supply mounted.
Figure 10:
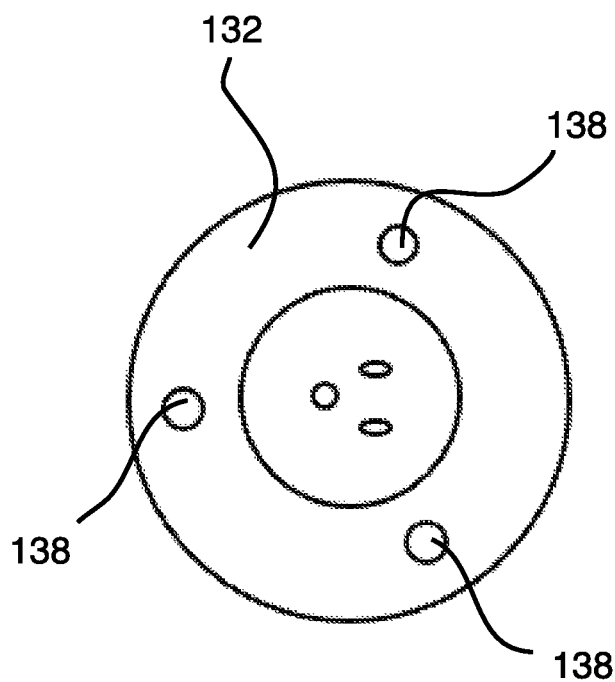
FIG. 10 is a front view of a power plug of the ramp of FIG. 3.

The ramp 10 comprises a power supply 120, such as shown in FIG. 9. The power supply 120 is mounted to the bottom of the ramp 10 and to the in-between wall 102 of the support structure 90. Fasteners 126, 128 (not shown for right side), such as screws or bolts extend through holes in side brackets 122, 124 to secure the power supply to the in-between wall 102. Lead wires 82 and 84 extend from the power supply and through wire apertures 81, 83 in the outside wall 101 of the inside channel 100 and through holes 27 in the base 12, and at least layers 14, 16, 18 to connect with the heating element 20. Power in wires (not shown) extend from the plug 132 to the power supply. The plug 132 is mounted at an opening 136 in the outside wall 101. A wire (not shown) may connect the plug 132 is mounted with fasteners 138, such as screws or bolts, secured to the outside wall 101 about the opening 136.

In some embodiments, the power supply provides 48 volts DC to the heating element 20. The power supply 120 is able to receive input power of 100 to 277 volts AC at 50/60 hz and a max of 4.3 amps and output power of +48 volts DC at 6.67 amps and up to the wattage requirements or capabilities of the heating element. In some embodiments, the power supply is model number WVZ-320-48V0N from Wintek Electronics Technology Limited, 4/F, Building 2, Tingwei Industrial Park 67, Bao'an District, Shenzhen City, Guangdong, China.

A method of manufacturing a heated portable ramp is disclosed. Cut and/or obtain a piece of paper 140, such as oak tag paper, that is at least double the width of the heating element 20. Fold the paper in half to create the first paper layer 16 and the second paper layer 22 joined along a fold 142.

A coat of adhesive, such as contact cement, is applied on the interior surfaces of the paper forming adhesive layers 18 and 21. Contact cement is allowed to dry. The heating element 20 is placed onto the first paper layer 16. The paper 140 is folded along the fold 142 so that the second paper layer 22 contacts the top of the heating element 20. Therefore the heating element is surrounded by the paper. The border areas 144 of each of the first and second paper layers join by the adhesive with each other to surround and enclose the heating element on all sides.

Then the paper enclosed heating element is laminated so that the paper and heating element combination is surrounded and enclosed in a protective plastic. The paper enclosed heating element can be fed into a laminating machine to cause the protective plastic to be formed on and surrounding the paper enclosed heating element. The laminating machine can apply heat to plastic sheets to cause the plastic sheets to form on and around the paper enclosed heating element as the paper enclosed heating element is fed into and through the laminating machine. The laminated paper enclosed heating element may be trimmed about the edges so that excess laminated protective plastic extending substantially beyond the paper is removed and the edge of the protective plastic is close to the edge of the paper. In some embodiments, the protective plastic extends from $1/16$ to $1/2$ inch beyond the edge of the paper.

A method of retrofitting an existing ramp is also disclosed. In the case of retrofitting, the existing base 12 upper surface is prepared so that it is free of oil, grease, dirt, and loose material. In some embodiments the preparation of the upper surface involves sanding the surface to create a substantially smooth surface. The sanding may remove an existing tread surface from the ramp, such removed tread surface may be course. The surface may be sanded with 80 grit sandpaper. Therefore, while the surface may have a substantially smooth appearance after sanding, it will have sufficient coarseness to allow contact cement or another adhesive to bond to the surface.

In the case of original manufacturing, rather than retrofitting, the upper surface of the base may be prepared by sanding such as described with retrofitting or may be provided with the surface already prepared.

Next, the first insulating ceramic layer 14 is applied to the base 12. The first ceramic layer 12 is allowed to dry. Where multiple coats of the ceramic substance are provided, each coat is applied and then allowed to dry before the next coat is applied in the ceramic layer. Then, contact cement is applied over the first ceramic layer 12. The contact cement is also applied to one side of the laminated, paper enclosed, heating element 23. The contact cement is allowed to dry on both. Then the side of the laminated, paper enclosed, heating element having the contact cement is placed and pressed down on the first ceramic layer 12, which also has contact cement. Therefore the laminated, paper enclosed, heating element is bonded to the ceramic covered base 12, as shown in FIG. 6.

In some embodiments, multiple segments of laminated, paper enclosed, heating element 23 may be required or desired to span the longitudinal length of the base. If so, then one or more additional laminated, paper enclosed, heating elements may be created according to the above process and then each of the laminated, paper enclosed, heating elements can be laid end-to-end along the length of the base 12 to cover the desired length of the base 12. Also, multiple segments of laminated, paper enclosed, heating element 23 may be laid side-by-side to span the desired width of the ramp in the case of a wide ramp or a narrow heating element.

Next fasteners 19, such as nails, screws, or bolts, are secured through the laminated, paper enclosed, heating element 23, and into the ceramic covered base 12. The fasteners 19 may be placed at the corners or along the edges or both of the laminated, paper enclosed, heating element 23.

One, two, or more apertures, such as holes 27, are drilled through the laminated, paper enclosed, heating element 23, and through the ceramic covered base 12 to provide a path to the power supply from the heating element for the lead wires 82, 84 to travel along. The wire apertures 81, 83 are also drilled or created in the support structure. The lead wires are fed through the hole(s) 27 for connecting to the power supply.

Next, the first rubber layer 24 is applied over the laminated, paper enclosed, heating element and any exposed ceramic covered base ramp surface. The rubber layer is allowed to dry.

Next the second ceramic layer 26 is applied. The ceramic layer may be applied over only the portion of the surface comprising the laminated, paper enclosed, heating element 23 or it may be applied over the entire surface. The ceramic layer 26 is allowed to dry. Where multiple coats of the ceramic substance are provided, each coat is applied and then allowed to dry before the next coat is applied in the ceramic layer.

Next, the second rubber layer 28 is applied. Where multiple coats of the rubber substance are provided, each coat is applied and then allowed to dry, or at least substantially or partially dry to the point where the substance is tacky to the touch, before the next coat is applied in the rubber layer. FIG. 7 shows the location of the laminated paper enclosed heating element 23 on the ramp under the first rubber layer 24, the second ceramic layer 26, and the second rubber layer 28.

The ramp 10 is turned over and the power supply 120 is mounted to the support structure 90 with the fasteners 126, 128. The lead wires 82, 84 are connected to the power supply. The plug 132 is mounted at the opening 136.

The forgoing process can be repeated for ramp 30 and for other ramps, portable walk surfaces, scaffolding walk surface, and other surfaces.

The first rubber layer, the second rubber layer, the first ceramic layer, and the second ceramic layer each can be applied by spraying the material on, by applying it with a brush or roller, or by other techniques known in the art.

In some embodiments, one or more of the paper layers is not used. In some embodiments, the first rubber layer is not used and the second ceramic layer is applied directly to the top of the heating element, which may or may not be laminated or surrounded in paper.

In each instance above where contact cement is used, it will be recognized that other adhesives could be used instead. While reference is made to a ramp herein, it is recognized that a ramp can act as a bridge, such as between to surfaces on the same level.

While the embodiments shown in the figures and described above provide a ramp for use with loading or unloading cargo from a vehicle or portable cargo container, the invention can be applied to in other applications, such as: handicap ramps, truck and trailer beds, hunting shack floors, stairs, sidewalks, hospital beds, trailer roofs, scaffolding platforms, scissor lift platforms, raised platforms, window washing rigs platforms, marine decks, marine engine compartment floors, gutters, roof lines, downspouts, shipping container floors, pipes, ventilation lines, building fresh air intake passages, and the like. In the case where the surface to have the heating element is applied is not flat, such as a gutter bottom or a downspout, the flexible heating element and the various layers can conform to curvature or shape of the surface.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A method of manufacturing a heated portable cargo ramp for use in loading or unloading cargo from a vehicle or portable cargo container, comprising steps of:
    applying a first ceramic insulating layer over a base ramp surface to form a ceramic covered base ramp surface, the first ceramic insulating layer is applied as a flowable liquid;
    enclosing a heating element in a paper to form a paper enclosed heating element, wherein the heating element is an elongated flexible mat;
    laminating the paper enclosed heating element to enclose the paper enclosed heating element in a protective plastic to create a laminated paper-enclosed heating element;
    applying an adhesive to one or both of one side of the laminated paper-enclosed heating element and the ceramic covered base ramp surface;
    placing the laminated paper-enclosed heating element on the ceramic covered base ramp surface;
    applying a first rubber layer over the laminated paper-enclosed heating element and the ceramic covered base ramp surface, the first rubber layer is applied as a flowable liquid and allowed to dry;
    applying a second ceramic insulating layer over at least a portion of the first rubber layer which extends over the laminated paper-enclosed heating element, wherein the second ceramic insulating layer is thinner than the first ceramic insulating layer; and,
    applying a second rubber layer over at least a portion of the second ceramic insulating layer which extends over the laminated paper-enclosed heating element.

2. The method of claim 1, comprising a step of before applying the first ceramic insulating layer, preparing the base ramp surface by removing oil, grease, dirt, and loose material.

3. The method of claim 1, comprising a step of, before applying the first ceramic insulating layer, comprising a step of sanding the base ramp surface.

4. The method of claim 1, wherein the step of enclosing the heating element, comprises steps of,
    applying an adhesive to one side of an elongated piece of paper having a width of at least twice the width of the heating element;
    placing the heating element on the side of the elongated piece of paper having the adhesive;
    folding the elongated piece of paper over an exposed upper side of the heating element to enclosed the heating element in the paper.

5. The method of claim 1, comprising the step of before the step of applying a first rubber layer, forming a wiring aperture through the laminated paper enclosed heating element, and through the base ramp surface to provide a path for wires extending from the heating element.

6. The method of claim 5, comprising the step of mounting a power supply to an underside of the ramp and connecting the heating element to the power supply with at least one wire extending through the wiring aperture.

7. The method of claim 5, comprising the step of mounting a power supply having a 48V output to an underside of the ramp and connecting the heating element to the power supply with at least one wire extending through the wiring aperture.

8. The method of claim 1, wherein the step of applying an adhesive is further defined in that the adhesive is contact cement.

9. The method of claim 1, wherein the step of applying the first ceramic insulating layer is further defined in that the first ceramic insulating layer comprises a ceramic infused epoxy paint; and wherein the step of applying the second ceramic insulating layer is further defined in that the second ceramic insulating layer comprises the ceramic infused epoxy paint.

10. A method of manufacturing a heated portable cargo ramp for use in loading or unloading cargo from a vehicle or portable cargo container, comprising steps of:
applying a first ceramic insulating layer over a base ramp surface to create a ceramic covered base ramp surface, the first ceramic insulating layer comprising a ceramic infused epoxy paint;
placing a flexible heating element mat on the ceramic covered base ramp surface;
applying a first rubber layer over the heating element mat and the ceramic covered base ramp surface;
applying a second ceramic insulating layer over at least a portion of the first rubber layer which extends over the heating element mat, wherein the second ceramic insulating layer is thinner than the first ceramic insulating layer, the second ceramic insulating layer comprising the ceramic infused epoxy paint; and,
applying a second rubber layer over at least a portion of the second ceramic insulating layer which extends over the heating element mat.

11. The method of claim 10, comprising the step of before placing, laminating the heating element mat to enclose the heating element mat in a protective plastic, wherein the heating element mat is an elongated flexible mat.

12. The method of claim 11, comprising the steps of,
before the step of laminating, enclosing the heating element mat in paper to result in a laminated paper-enclosed heating element mat after the step of laminating; and,
applying an adhesive to one or both of one side of the laminated paper-enclosed heating element mat and the ceramic covered base ramp surface.

13. The method of claim 10, wherein the step of applying a first rubber layer is further defined in that the first rubber layer comprises a polyurethane infused with rubber granules; and wherein the step of applying the second rubber layer is further defined in that the second rubber layer comprises the polyurethane infused with rubber granules.

14. A heated portable cargo ramp for use in loading or unloading cargo from a vehicle or portable cargo container, comprising:
a base comprising a length that is longer than a width of the base;
a first ceramic insulating layer over the base;
a heating element over the first ceramic insulating layer, the heating element comprises an elongated flexible mat;
a first rubber layer over the heating element;
a second ceramic insulating layer over at least a portion of the first rubber layer which extends over the heating element; and,
a second rubber layer over at least a portion of the second ceramic insulating layer which extends over the heating element.

15. The ramp of claim 14, wherein the heating element is laminated to provide a protective plastic that encloses the heating element.

16. The ramp of claim 14, comprises a paper layer that encloses the heating element.

17. The ramp of claim 14, wherein the first ceramic insulating layer and the second ceramic insulating layer comprise a ceramic infused epoxy paint.

18. The ramp of claim 14, wherein the first rubber layer and the second rubber layer comprise a polyurethane infused with rubber granules.

19. The ramp of claim 14, wherein the base comprises a support structure supporting a base platform.

20. The ramp of claim 14, comprising a power supply mounted on an underside of the base and connected to the heating element by wires.

* * * * *